United States Patent
Nedelman

(10) Patent No.: US 9,326,053 B2
(45) Date of Patent: Apr. 26, 2016

(54) FLAT PANEL SPEAKER ASSEMBLY INTEGRATED WITH VEHICLE TRIM

(71) Applicant: FORD GLOBAL TECHNOLOGIES, LLC, Dearborn, MI (US)

(72) Inventor: Marc D. Nedelman, Waterford, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 67 days.

(21) Appl. No.: 14/202,543

(22) Filed: Mar. 10, 2014

(65) Prior Publication Data

US 2015/0256912 A1   Sep. 10, 2015

(51) Int. Cl.
*H04R 1/02* (2006.01)
*B60R 13/02* (2006.01)
*B60R 11/02* (2006.01)
*H04R 7/04* (2006.01)

(52) U.S. Cl.
CPC .............. *H04R 1/02* (2013.01); *B60R 11/0217* (2013.01); *B60R 13/02* (2013.01); *B60R 13/0237* (2013.01); *B60R 13/0243* (2013.01); *H04R 1/025* (2013.01); *H04R 7/045* (2013.01); *B60R 2013/0287* (2013.01); *H04R 2499/13* (2013.01)

(58) Field of Classification Search
CPC .................................. H04R 5/02; H04R 1/025
USPC .................... 381/389, 337, 152, 423
See application file for complete search history.

(56) References Cited

U.S. PATENT DOCUMENTS

| | | | |
|---|---|---|---|
| 4,514,599 A | 4/1985 | Yanagishima et al. | |
| 5,446,999 A * | 9/1995 | Inaba | B60J 5/0415 296/146.5 |
| 5,693,917 A * | 12/1997 | Bertagni | H04R 7/04 181/173 |
| 6,215,884 B1 * | 4/2001 | Parrella | H04R 7/04 381/186 |
| 6,320,967 B1 | 11/2001 | Azima et al. | |
| 6,356,641 B1 | 3/2002 | Warnaka et al. | |
| 6,377,695 B1 * | 4/2002 | Azima et al. | 381/152 |
| 6,389,147 B1 * | 5/2002 | Rush | H04R 5/02 381/302 |
| D496,027 S * | 9/2004 | Dayan | D14/215 |
| 6,929,091 B2 * | 8/2005 | Bertagni | H04R 1/02 181/150 |
| 7,050,593 B1 | 5/2006 | Emerling et al. | |
| 7,088,836 B1 | 8/2006 | Bachmann et al. | |
| 8,103,024 B2 | 1/2012 | Bachmann et al. | |
| 8,548,190 B2 | 10/2013 | Hori et al. | |
| 2003/0066596 A1 * | 4/2003 | Van Manen | B26D 7/1818 156/245 |
| 2003/0081800 A1 | 5/2003 | Klasco et al. | |
| 2008/0279412 A1 * | 11/2008 | Bertoli | H04R 1/025 381/389 |
| 2011/0211722 A1 * | 9/2011 | Bank | H04R 7/045 381/369 |

FOREIGN PATENT DOCUMENTS

WO   2011060163 A1   5/2011

* cited by examiner

*Primary Examiner* — Brian Ensey
*Assistant Examiner* — Julie X Dang
(74) *Attorney, Agent, or Firm* — Vichit Chea; MacMillan, Sobanski & Todd, LLC

(57) ABSTRACT

A trim panel assembly for a vehicle incorporates a flat panel speaker. The trim panel defines an interior surface of a passenger compartment of the vehicle and has a speaker aperture with a peripheral edge. A diaphragm panel is disposed in the speaker aperture with a trim face and a rear face. A flexible surround joins the diaphragm panel to the aperture edge so that the diaphragm panel is movable along an axis of the speaker aperture and so that vibrations from the diaphragm panel to the trim panel are damped. An exciter receives audio signals for reproduction. The exciter has an actuator suspended in a housing. The actuator is fixed to the rear face of the diaphragm panel. A support bracket spans the speaker aperture and has first and second ends affixed to a rear side of the trim panel and an intermediate point affixed to the housing of the exciter.

15 Claims, 5 Drawing Sheets

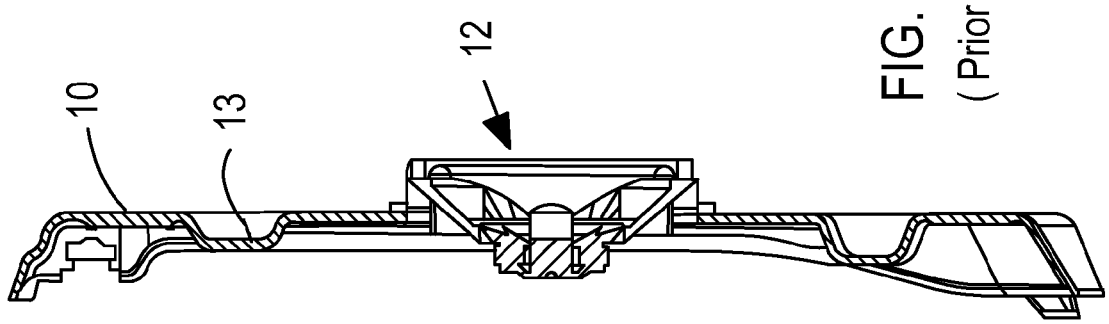
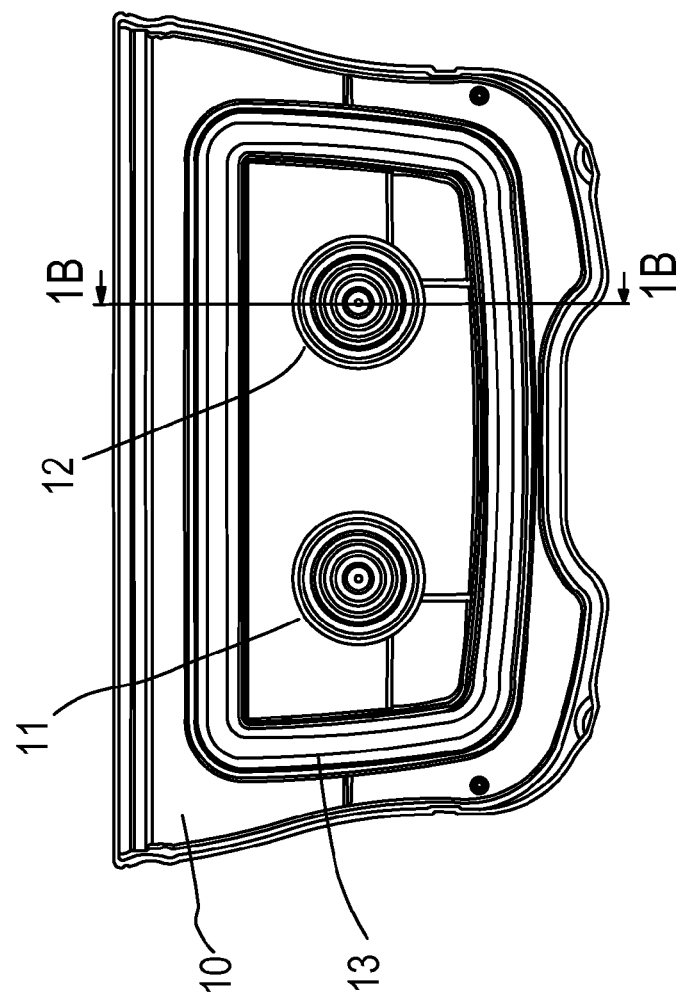

FLAT PANEL SPEAKER ASSEMBLY INTEGRATED WITH VEHICLE TRIM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to audio speaker systems for automotive vehicles, and, more specifically, to integration of flat speakers with automotive interior trim panels.

The use of traditional cone-shaped loudspeakers often compromises the design of vehicle interior trim panels by occupying space that could otherwise be utilized for interior storage or to add volume to the passenger cabin. Recent developments in flat panel speaker technology has provided the opportunity to place speakers on a given trim panel to increase available space for storage or other purposes.

A flat panel speaker may be used as a self-contained element which is separately manufactured and then assembled onto the vehicle interior. However, self-contained flat panel speakers may be difficult to integrate into a desired styling of the interior trim panels due to shape and/or mounting limitations. Thus, attempts have been made to integrate the exciter of a flat-panel speaker directly onto a trim panel element. Such integration may also result in reduced overall costs.

The prior art discloses attempts to incorporate the exciter of a flat panel speaker design onto a trim panel using the trim element itself as the vibrating diaphragm. However, significant difficulties have been encountered in this approach. For example, U.S. Pat. No. 7,050,593 illustrates use of an automotive headliner panel as the sound surface for a flat panel speaker. U.S. Pat. No. 6,377,695 similarly discloses an exciter attached to vehicle roof lining, door panels, dashboards, and rear parcel shelves, and it discloses foam materials for the radiating sound surface. Other materials typically used for the disclosed trim surfaces include glass-filled urethane foam and molded plastics such as PVC and PPO. Thus, the typical materials used for automotive trim surfaces tend to be sound absorbent and are far from ideal for use to propagate sound.

A further problem associated with existing deployments of flat panel speakers in interior trim panels relates to damping and isolation. By mounting an exciter directly to the backside of a headliner or other trim panel substrate, the sound production area (i.e., the region where panel vibrations generate sound) may extend to other assembled components on the panel (e.g., lighting components, panel attachment points, and electrical accessories) which may adversely affect the resonance of the acoustic surface and its ability to reproduce sound.

Yet another problem associated with known arrangements relates to inefficiency of the resulting speaker. The exciter must overcome its own mass when energized due to the fact that it is solely supported by its attachment with the panel surface. This limits voice coil excursion and the subsequent transmission of sound into the acoustic sound surface.

SUMMARY OF THE INVENTION

In one aspect of the invention, a trim panel assembly for a vehicle incorporates a flat panel speaker. The trim panel defines an interior surface of a passenger compartment of the vehicle and has a speaker aperture with a peripheral edge. A diaphragm panel is disposed in the speaker aperture with a trim face and a rear face. A flexible surround joins the diaphragm panel to the aperture edge so that the diaphragm panel is movable along an axis of the speaker aperture and so that vibrations from the diaphragm panel to the trim panel are damped. An exciter receives audio signals for reproduction. The exciter has an actuator suspended in a housing. The actuator is fixed to the rear face of the diaphragm panel. A support bracket spans the speaker aperture and has first and second ends affixed to a rear side of the trim panel and an intermediate point affixed to the housing of the exciter.

BRIEF DESCRIPTION OF THE DRAWINGS

FIGS. 1A and 1B are bottom and side views of a package tray carrying a cone-shaped speaker.

DETAILED DESCRIPTION OF PREFERRED EMBODIMENTS

The present invention provides a hybrid speaker assembly in which a trim panel employs a composite structure creating a speaker surround and diaphragm in a localized region of the trim panel. The invention utilizes the trim panel as a mounting ring analogous to a speaker frame by directly connecting a portion of the exciter to the trim panel via a support bracket, thereby supporting the weight of the exciter to improve speaker efficiency.

Referring now to FIGS. 1A and 1B, an automotive trim panel 10 is formed as a package tray to be installed at a rearward end of a passenger cabin in a vehicle. Trim panel 10 may be comprised of a molded plastic substrate, for example. A pair of stereo speakers 11 and 12 are mounted at trim panel 10 in a region bounded by a recessed channel 13 which provides stiffness as well as a styling cue for the ornamental appearance of the package tray. As shown in FIG. 1B, speaker 12 occupies signification space behind and in front of trim panel 10.

Figure 2B:
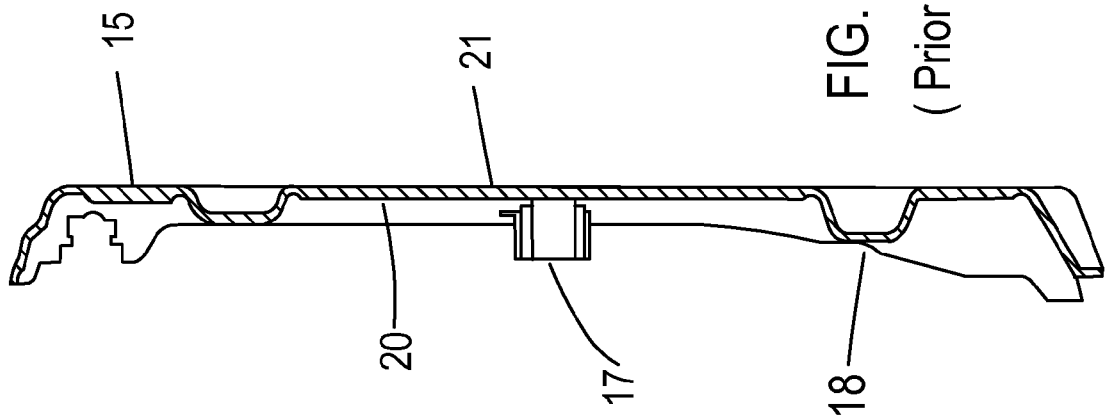
FIGS. 2A and 2B are bottom and side views of a package tray carrying flat panel speaker exciters of the prior art.
Figure 2A:
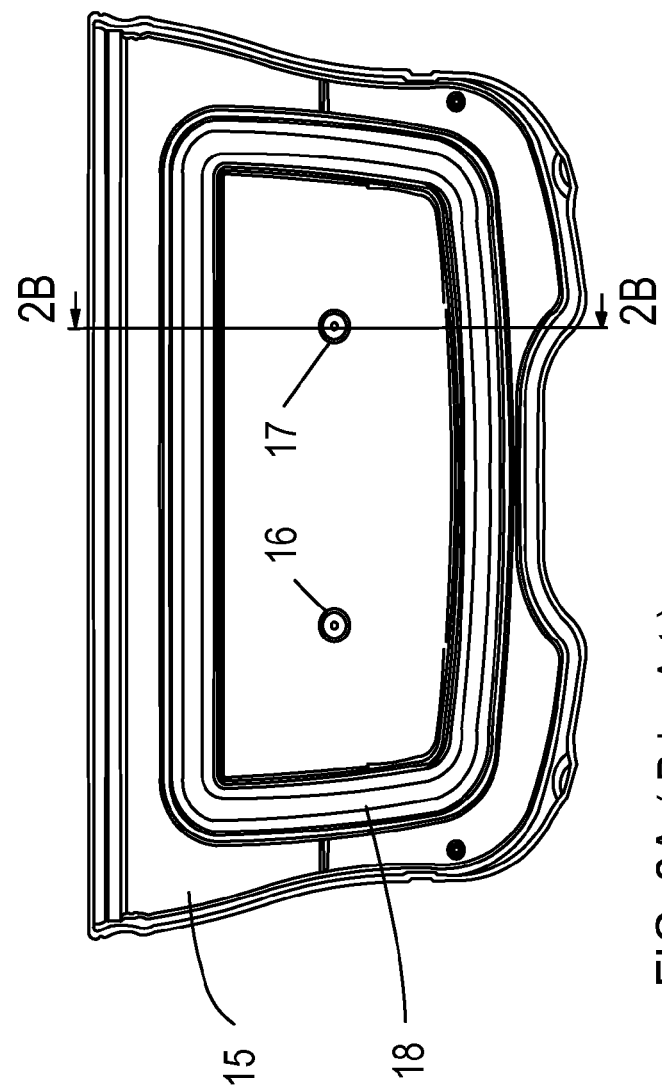

FIGS. 2A and 2B illustrate the application of an exciter directly to a trim panel. A package tray trim panel 15 has stereo exciters 16 and 17 mounted to an inner surface 20 of panel 15 inside stiffening/styling channel 18. More specifically, an actuator such as a voice coil of exciter 17 is bonded to inner surface 20. Vibration by exciter 17 causes sound to be emitted from outer surface 21 of panel 15. However, sound generation is inefficient due to the unsupported mass of exciter 17 and due to undamped vibrations propagating to undesired regions of panel 15 such as channel 18 and other accessories, structural elements, and mounting structures.

Figure 3B:
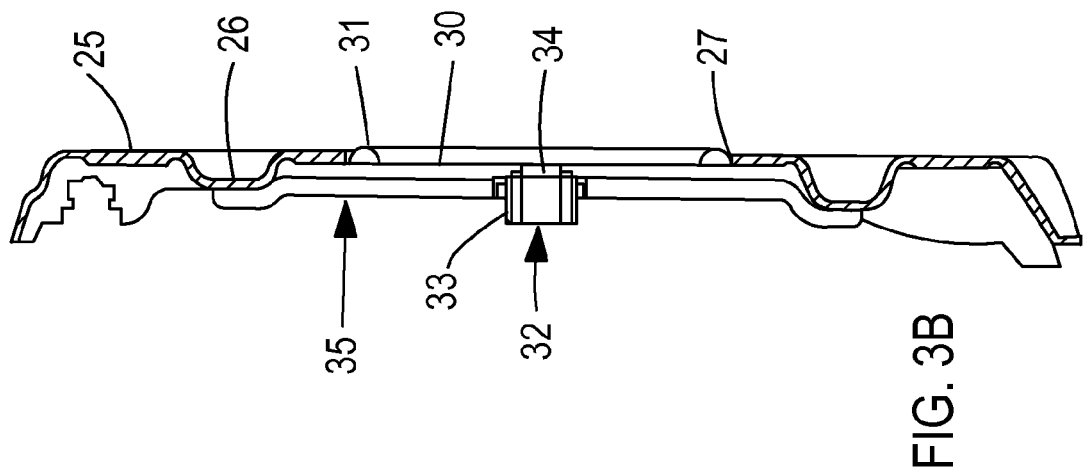
FIGS. 3A and 3B are bottom and side views of a package tray with integrated flat panel speakers of one embodiment of the present invention.
Figure 3A:
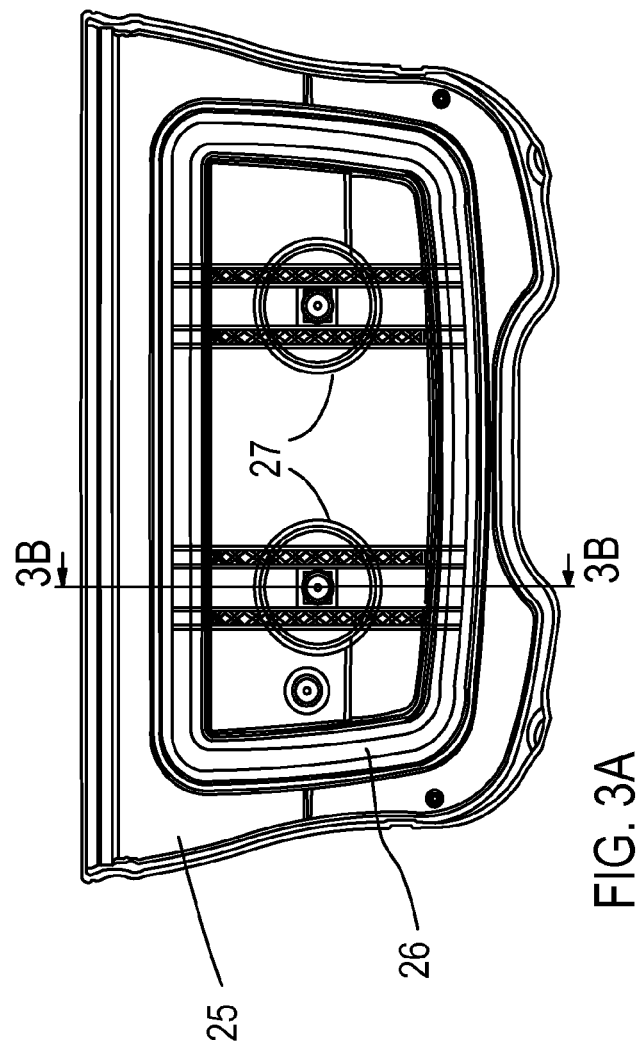
Figure 4:
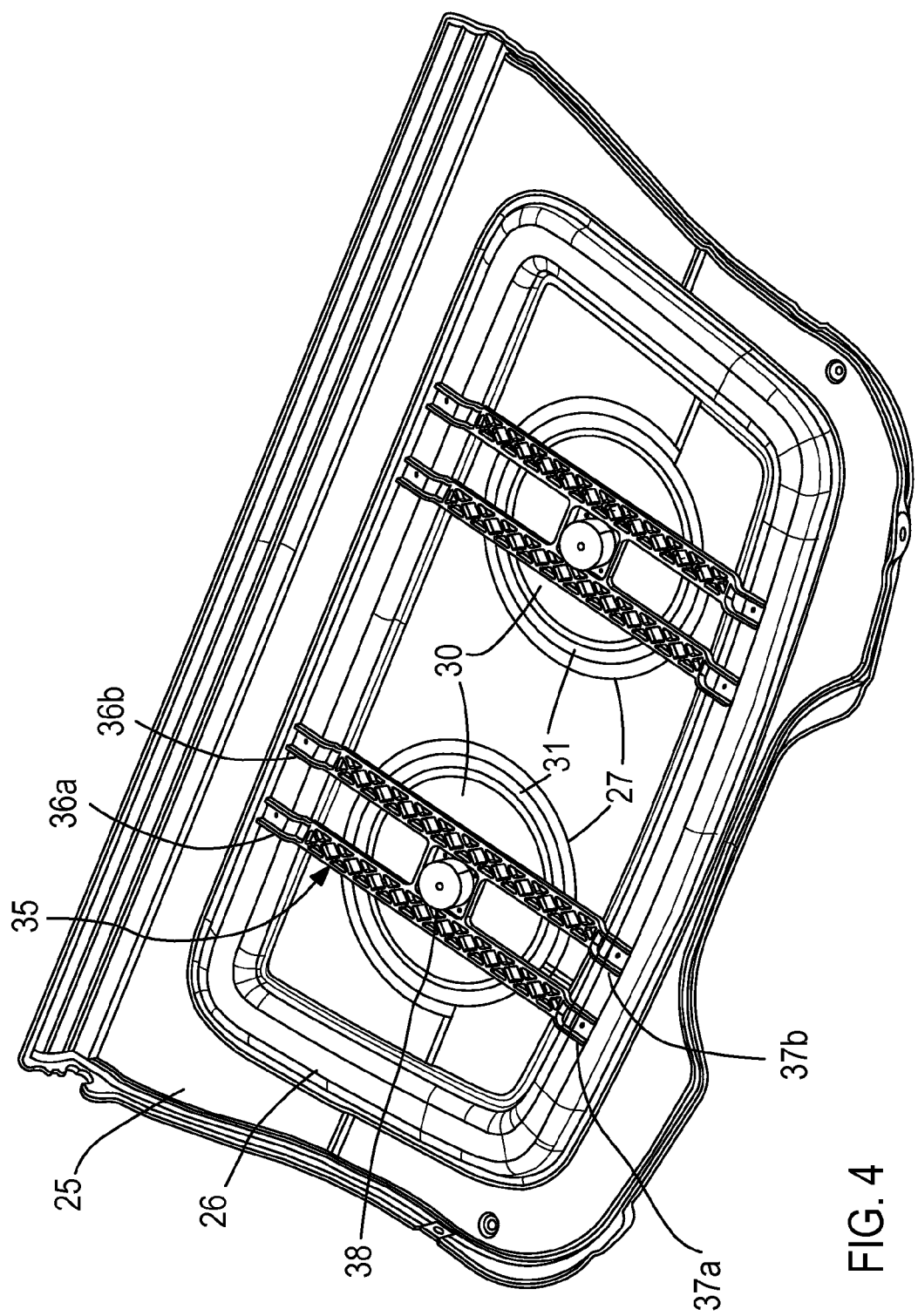
FIG. 4 is a perspective view of the package tray and flat panel speakers of FIGS. 3A and 3B.

One preferred embodiment of the invention is shown in FIGS. 3A, 3B, and 4, wherein a package tray trim panel 25 includes stiffening/styling channel 26 around a center region including a pair of speaker apertures 27. Each speaker aperture 27 is defined by a peripheral edge which is preferably circular, but can alternatively be comprised of any desired shape or profile such as oval and rectangular. Disposed within speaker apertures 27 are a pair of diaphragm panels 30 each having a visible trim face on the inside of the passenger cabin and having a rear face. A flexible surround 31 joins each diaphragm panel 30 to trim panel 25. Preferably, surrounds 31 are bonded around their outer edges to the peripheral edges of apertures 27 using adhesive in a known manner.

Each of the stereo flat-speaker assemblies includes an exciter. As shown in FIG. 3B, an exciter 32 includes a housing 33 and an actuator 34. Actuator 34 is bonded to diaphragm panel 30, and housing 33 is affixed to a support bracket 35 that spans aperture 27 and has intermediate point 38 affixed to housing 33 of exciter 32. In the illustrated embodiment, support bracket 35 has an H-shape having first ends 36a and 36b at one end of bracket 35 and second ends 37a and 37b at the other end. Ends 36 and 37 are attached to channel 26 of panel 25 for added rigidity. However, bracket 35 can be affixed directly or indirectly to any portion of trim panel 25.

Since the weight of the exciter 32 is supported by bracket 35, it does not have to overcome its own weight in imparting vibrations to diaphragm panels 30. Therefore, improved speaker efficiency is obtained. Moreover, the vibrating surface is confined to diaphragm panels 30 by surrounds 31, which allow diaphragm panels 30 to move along an axis of apertures 27. Vibrations from diaphragm panels 30 are damped prior to propagating trim panel 25.

As shown in the current embodiment, an outer trim face of diaphragm panels 30 may be preferably substantially coplanar with trim panel 25. By bonding outer edges of surrounds 31 to speaker aperture peripheral edges 27 and inner edges of surrounds 31 to outer edges of diaphragm panels 30, speaker apertures 27 are completely sealed. Surround 31 may preferably be formed with a semi-toroidal shape and may be comprised of a urethane foam or other material known for use in a speaker surround.

Diaphragm panels 30 may preferably be comprised of a honeycomb core with a laminate covering such as paper. A skin or other decorative layer may be applied to the trim face in order to obtain a desired styling appearance.

Exciter 32 may be comprised of a motor driver type of exciter or could include a piezoelectric or other type of vibrator.

Figure 5:
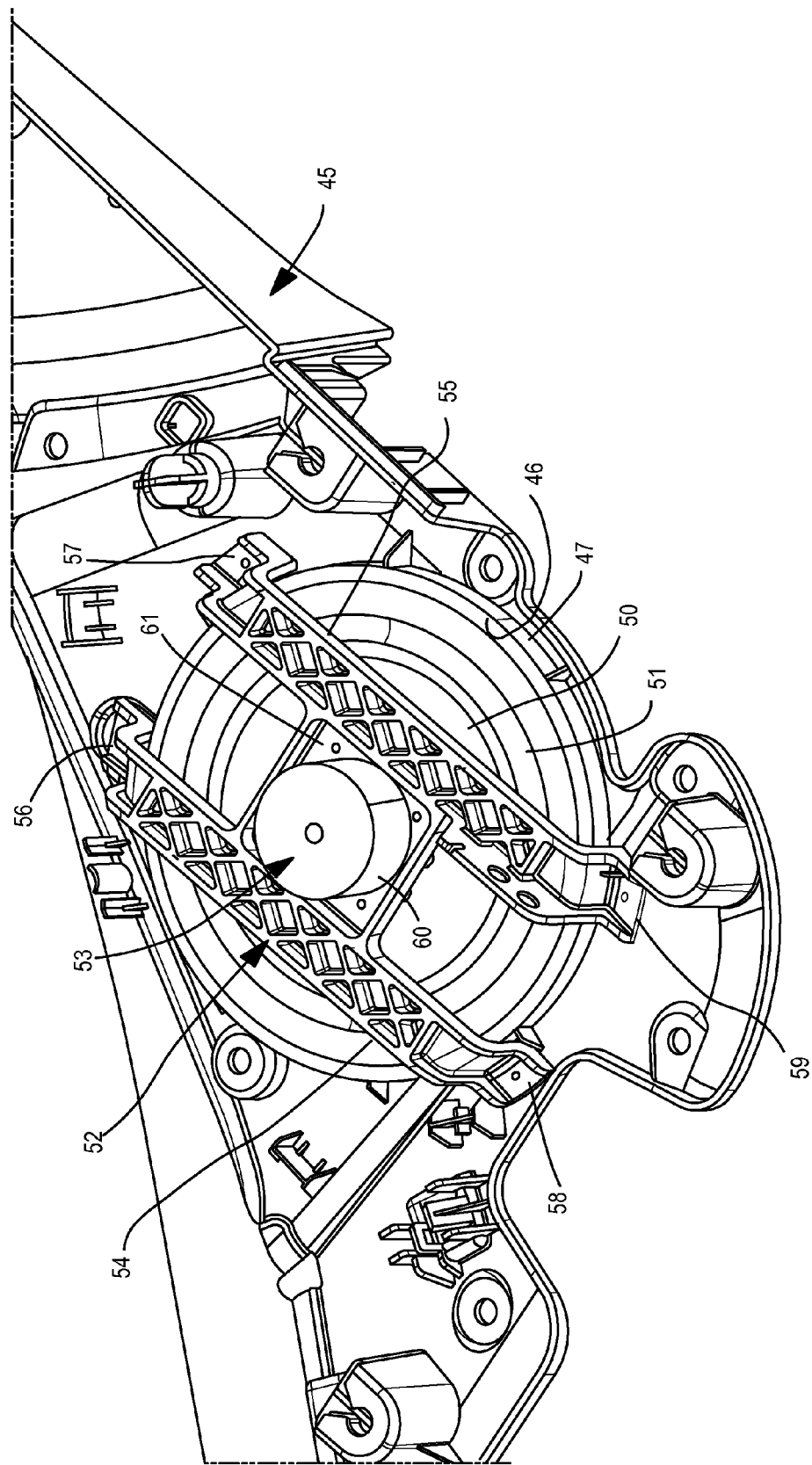
FIG. 5 is a perspective view of a door trim panel with an integrated flat panel speaker according to another embodiment of the invention.

FIG. 5 shows an alternative embodiment incorporated into a door trim panel 45. A speaker aperture 46 is surrounded by a collar or flange 47 for a better finished appearance and for added strength. A diaphragm panel 50 is disposed within aperture 46, and a flexible surround 51 is joined to diaphragm panel 50 and speaker aperture 46. An H-shaped support bracket 52 carries an exciter 53. Bracket 52 has a first leg 54 and a second leg 55 joined by a central bridge 61 to which exciter 53 is mounted. Legs 54 and 55 have ends 56 and 57 and second ends 58 and 59 joined to an inside surface of panel 45 on substantially opposite sides of aperture 46. The mounting can be obtained by screws, clips, sheets taking, or other known methods. Exciter 53 has a housing 60 mounted to bridge portion 61 which is intermediate between the ends of bracket 52 so that a moving actuator (not shown) can be bonded with diaphragm panel 50.

The foregoing embodiments have demonstrated a flat panel speaker assembly that achieves space and cost savings of a flat panel design while improving efficiency and adaptability for use on panels of various sizes and shapes.

What is claimed is:

1. A trim panel assembly for a vehicle, comprising:
   a trim panel defining an interior surface of a passenger compartment of the vehicle, the trim panel having a speaker aperture with a peripheral edge, and having a rigid channel around the speaker aperture;
   a diaphragm panel disposed in the speaker aperture with a trim face and a rear face;
   a flexible surround joining the diaphragm panel to the peripheral edge so that the diaphragm panel is movable along an axis of the speaker aperture and so that vibrations from the diaphragm panel to the trim panel are damped;
   an exciter receiving audio signals for reproduction, wherein the exciter has an actuator suspended in a housing, and wherein the actuator is fixed to the rear face of the diaphragm panel; and
   a support bracket spanning the speaker aperture and having first and second ends affixed to a rear side of the trim panel at the channel, and the support bracket having an intermediate point affixed to, and supporting, the housing of the exciter.

2. The assembly of claim 1 wherein the trim face is substantially coplanar with the trim panel.

3. The assembly of claim 1 wherein the peripheral edge, the diaphragm panel, and the surround are substantially circular.

4. The assembly of claim 1 wherein the surround has an outer edge bonded to the peripheral edge and has an inner edge bonded to the diaphragm panel, whereby the speaker aperture is sealed.

5. The assembly of claim 1 wherein the trim panel is comprised of a plastic-molded package tray at a rearward end of the passenger compartment.

6. The assembly of claim 1 wherein the trim panel is comprised of a plastic-molded door trim panel on a passenger door of the vehicle.

7. The assembly of claim 1 wherein the surround has a semi-toroidal shape.

8. The assembly of claim 1 wherein the surround is comprised of a urethane foam.

9. The assembly of claim 1 wherein the diaphragm panel is comprised of a honeycomb core with a laminate covering.

10. The assembly of claim 1 wherein the actuator is comprised of a voice coil.

11. A trim panel assembly for a vehicle, comprising:
    a trim panel with a rigid channel around a speaker aperture;
    a flat diaphragm disposed in the aperture;
    a flexible surround bonded between the diaphragm and a peripheral edge of the aperture damping vibrations to and sealing the trim panel;
    an exciter with a movable portion fixed to a diaphragm rear face; and
    a bridge spanning the aperture and affixed to an exciter housing and the channel.

12. The assembly of claim 11 wherein the trim panel is comprised of a plastic-molded package tray at a rearward end of a passenger cabin of a vehicle.

13. The assembly of claim 11 wherein the trim panel is comprised of a plastic-molded door trim panel on a passenger door of the vehicle.

14. The assembly of claim 1 further comprising:
    a second speaker aperture in the trim panel with a second peripheral edge;
    a second diaphragm panel disposed in the second speaker aperture with a trim face and a rear face;
    a second flexible surround joining the second diaphragm panel to the second peripheral edge so that the second diaphragm panel is movable along an axis of the second speaker aperture and so that vibrations from the second diaphragm panel to the trim panel are damped;

a second exciter receiving audio signals for reproduction, wherein the second exciter has an actuator suspended in a housing, and wherein the actuator of the second exciter is fixed to the rear face of the second diaphragm panel; and a second support bracket spanning the second speaker aperture and having first and second ends affixed to the rear side of the trim panel and having an intermediate point affixed to the housing of the second exciter.

15. The assembly of claim 14 wherein the trim panel further comprises a rigid channel around a plurality of speaker apertures and wherein each support bracket attaches to the rear side of the trim panel at the rigid channel.

\* \* \* \* \*